United States Patent [19]
DeLima

[11] Patent Number: 5,158,593
[45] Date of Patent: Oct. 27, 1992

[54] BIOREACTOR FOR COMPRESSIBLE, PARTICULATE, POROUS SOLIDS

[76] Inventor: Daniel D. DeLima, 10 Condit Ct., Roseland, N.J. 07068

[21] Appl. No.: 631,485

[22] Filed: Dec. 20, 1990

[30] Foreign Application Priority Data

Jan. 9, 1990 [GB] United Kingdom ............... 9000430

[51] Int. Cl.$^5$ ............................................. C05F 9/04
[52] U.S. Cl. ............................................ 71/9; 71/10; 210/603; 210/614
[58] Field of Search ................. 71/9, 10; 210/603, 614

[56] References Cited

U.S. PATENT DOCUMENTS

| | | | |
|---|---|---|---|
| 4,100,023 | 7/1978 | McDonald | 71/10 X |
| 4,510,243 | 4/1985 | Haga et al. | 210/614 |
| 4,919,815 | 4/1990 | Copa et al. | 210/603 |

Primary Examiner—Ferris Lander
Attorney, Agent, or Firm—Kirschstein, Ottinger, Israel & Schiffmiller

[57] ABSTRACT

Lignocellulosic material such as agricultural residues, e.g. straw and bagasse, can be converted into products that can be easily transformed into feeds, fuels, and soil improver. The reactor described herein affords simple efficient transformation of lignocellulosics to acidic organic liquid, heat, and ligneous sludge residue in a typical use. The acidic organic liquid may be used as the main component in the production of SCP, the heat may be used subsequently for heating or drying, and the ligneous sludge, when dewatered, used as soil improver or as fuel.

10 Claims, 7 Drawing Sheets

BIOREACTOR FOR COMPRESSIBLE, PARTICULATE, POROUS SOLIDS

DESCRIPTION

A containment wherein particles of compressible porous material (i.e. straw chips) are fed into the upper region and are moved downwards as it is reacted with reagent fluids and as the solids residue is removed from the bottom of the reactor. The downward flow of particles is motivated by gravity and the force applied to the top of the mass of particles by the cover of the containment. The force applied by the cover on the contained mass is intermittently increased by the reduction of the gas pressure within the containment.

The contained particulate material is divided by arrays of grids of emitters and collectors of fluids into four (4) principal zones: (1) The upper zone wherein the particles are in a predominantly gaseous environment. (2) The intermediate zone wherein the predominantly gaseous environment meets with the predominantly liquid environment. (3) The lower zone wherein there is a predominantly liquid environment. (4) The discharge zone wherein the solids particles resultant from the reactions in the above zones are concentrated by sedimentation and stored for discharge. Liquids reacting with the compressible particles in zone 3 are mainly recovered as liquids from an array of collectors at the bottom of zone 2 (top of zone 3). Gas reacting with particles in zone 1 are removed mainly as gas at the collectors at the inside top of the reactor (top of zone 1). The residue of the solids in liquid is removed from the bottom of the discharge zone 4.

The reactor has the form of an inflatable tent-like upper structure bonded to line depression in the form of a conical, pointing downwards, lower part. Zone 1 is in the upper part. Zone 4 is at the bottom of the lower part. Zone 3 is in the lower part, above zone 4. Zone 2 separates zones 3 and 1. The material of construction is flexible, leak proof sheeting. From the bottom of the lower zone a discharging means exist such that the reacted solid residual particles may be discharged. The volume at the base of the containment above the discharge port is conically shaped pointing downward, the discharge port being at the end of the cone (zone 4). At the top of the discharge zone lies a horizontal grid with an array of liquid emitters. The spacing of the grid is such that the solid particles can pass through the grid into the discharge zone. Zone (3) lies above the grid. The sides are an extension of the sides of the pointing downwards cone. Into the sides bladders are constructed which may be inflated or deflated as desired by the introduction or discharge of fluid from the bladder when desired. The bladders that are adjoining the sides exist so that by inflation and deflating the bladders the shear forces thereby produced disrupt channeling of the rising liquids through the particulate mass. These shear forces with the liquid, fluidize the mass so that the mass may travel downwards into the section of decreasing diameter of the cone to the grid before discharge. The liquid introduced at the grid below the bladders, flow upwards through the particulate mass. The liquids flow to an array of collectors at the bottom of zone 2 (top of zone 3). This lattice of collectors which is the bottom of the intermediate zone (zone 2) is the means by which the reacted liquids are collected and then removed from the reactor. The spacing in the horizontal lattice allows the particulate material to pass vertically downwards.

At the top of this lattice (top of zone 2) there is an array of gas emitters connected to an external supply of gas, by such means gas is introduced to the bottom of the top zone (zone 1). The volume between the emitters on the top of the lattice (bottom of zone 1) and the collectors at the bottom of the lattice (top of zone 3) describes the intermediate zone 2. In this zone the environment of the particulate compressible solids changes from predominantly gaseous to predominantly liquid. The solids traveling downwards through the lattice, therefore change their environment. The distance between the top of the lattice and the bottom is sufficient to accommodate the rise of the liquid gas interface as fresh materials are forced into the liquid predominant zone from the gas predominant zone above, in response to the cover forcing solids downwards, caused by the reduction of internal gas pressure in the zone above to less than atmospheric. The gas introduced at the bottom of zone 1 flows through the particulate mass upwards. The resultant gas is removed by collectors on the top of the reactor inside of the cover and removed from the reactor. On the inside of the cover there exist liquid emitters such that the particulate, compressible, porous solids may be wetted after their introduction to the containment. To the tubes connected to the collectors of gas on the inside of the cover, a gas pump is connected as to provide a means of changing the internal gas pressure relative to the external pressure. At the top of the reactor a filling port for particulate compressible porous solids exist such that, when filling, the particulate material stacks in the form of a cone pointing upwards. The cover, while filling, is lifted upwards away from the contents by increasing the internal pressure above the external pressure. After filling the internal pressure is reduced and the cover rests on the freshly added materials.

The entire containment is rendered leak-proof by valves and bonding the flexible plastic.

EXPLANATION OF DRAWINGS

FIG. 1, (A) Entry port for compressible particulate solids to reactor in zone 1. (B) Liquids distribution emitting array on inside cover to wet contents of zone 1. (C) Structure and injection system for temperature regulation of material in zone 1. Onto the injector tips temperature measuring devices are fixed to measure temperature in zone 1. (D) Gas removal port connected to gas pump for adjusting internal pressure and for removing gaseous product. (E) Gas introduction and array of gas emitters at top of zone 2, (Z2). (F) Liquid removal and array of liquid collectors at bottom of zone 2, (Z2). The structures supporting the arrays (E) and (F) constitutes the intermediate lattice. (G) Skin of containment made of flexible sheeting supported by contents of compressible material. (H) Skin of containment supported by external structure that is fixed in shape. (I) Bladders forming part of the sides of zone 3, (Z3). (J) Tubing to bladders to fill and discharge pump so that bladders may be filled and discharged. (K) Lower lattice of liquid emitters extending to emitters between bladders. (L) Liquid introduction to emitter lattice (K) and separating the dynamic zone 3 from the sedimentary zone 4. (Z4) Zone 4 where material passing through lattice formed by (L) is concentrated for discharge. (M) Discharge tube from bottom of zone 4. (N) The array and structure to which (A), (B), (C), and (D) are fixed. (O) Compressed air injection line and injector to motivate the discharge of sediment (S) in zone 4. (v1, V2, V3, V4, V5, v6, v7, v8, V9, and v10) are valves so that the reactor may be sealed while changing pressure or to control the flow of fluids, feeds and discharges. (T) Temperature probe. (W) Moisture probe.

FIG. 2C XO is the volume in Z1 that be filled when the reactor is reinflated. It also shows that Z4 may be voided at the stage so as to be receptive to more residue. It shows also S from FIG. 2B to S in FIG. 2C (now discharged).

FIG. 8 shows the circulation of gas through zone 1. A thermally controlled valve (V11) regulates the introduction of air (oxygen) so that the oxygen content of the circulated gas changed in response to a change in temperature within zone 1.

THE COMPONENTS IN TYPICAL OPERATION

Figure 1:
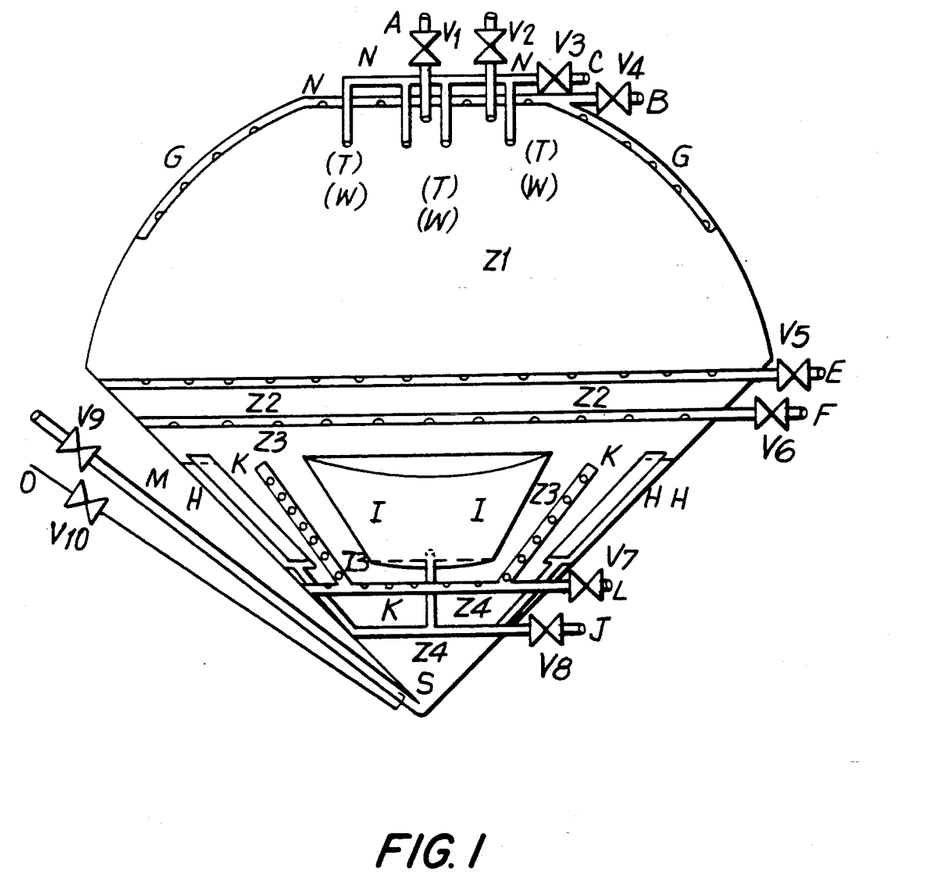
Figure 2A:
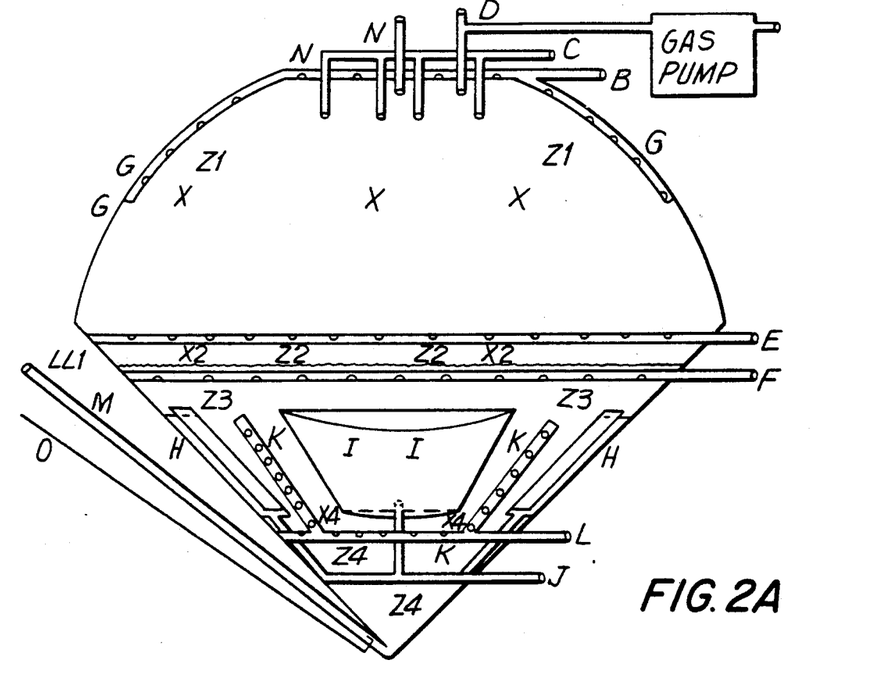
FIG. 2A shows the relative position of material in various zones before the reduction of the internal pressure. It also shows the normal liquid level LL1.
Figure 2B:
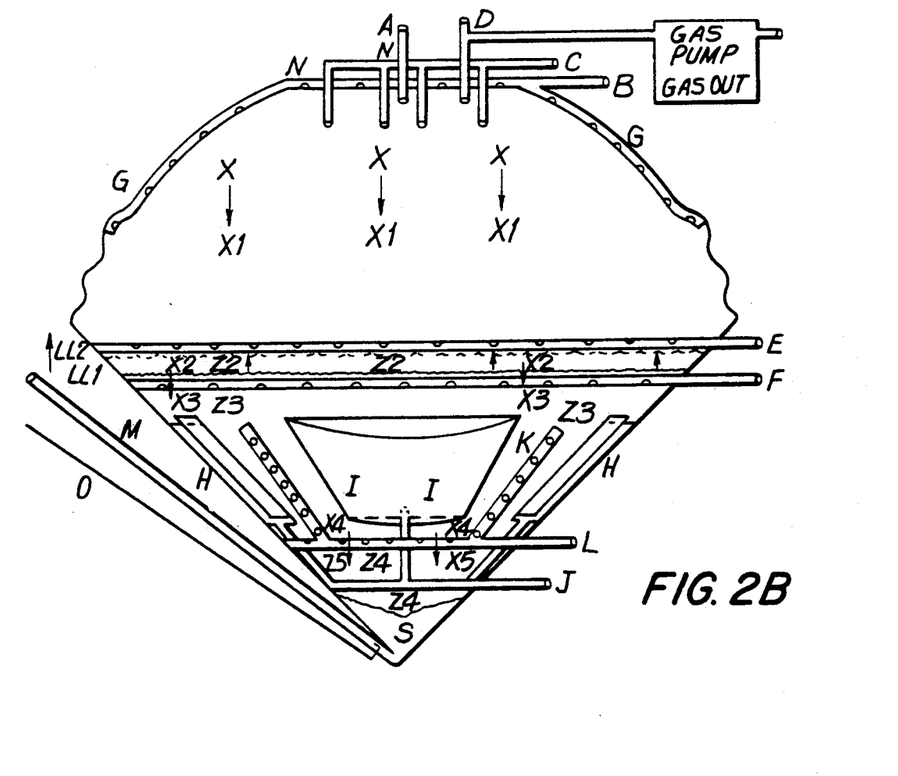
FIG. 2B shows the relative movement of the contents in response to the reduction of internal pressure, i.e. (X to X1, X2 to X3, X4 to X5). It also shows the rise in the liquid level in response to materials being emerged in Z2, i.e. (LL1 to LL2). It also shows residue forced into Z4 (s).
Figure 2C:
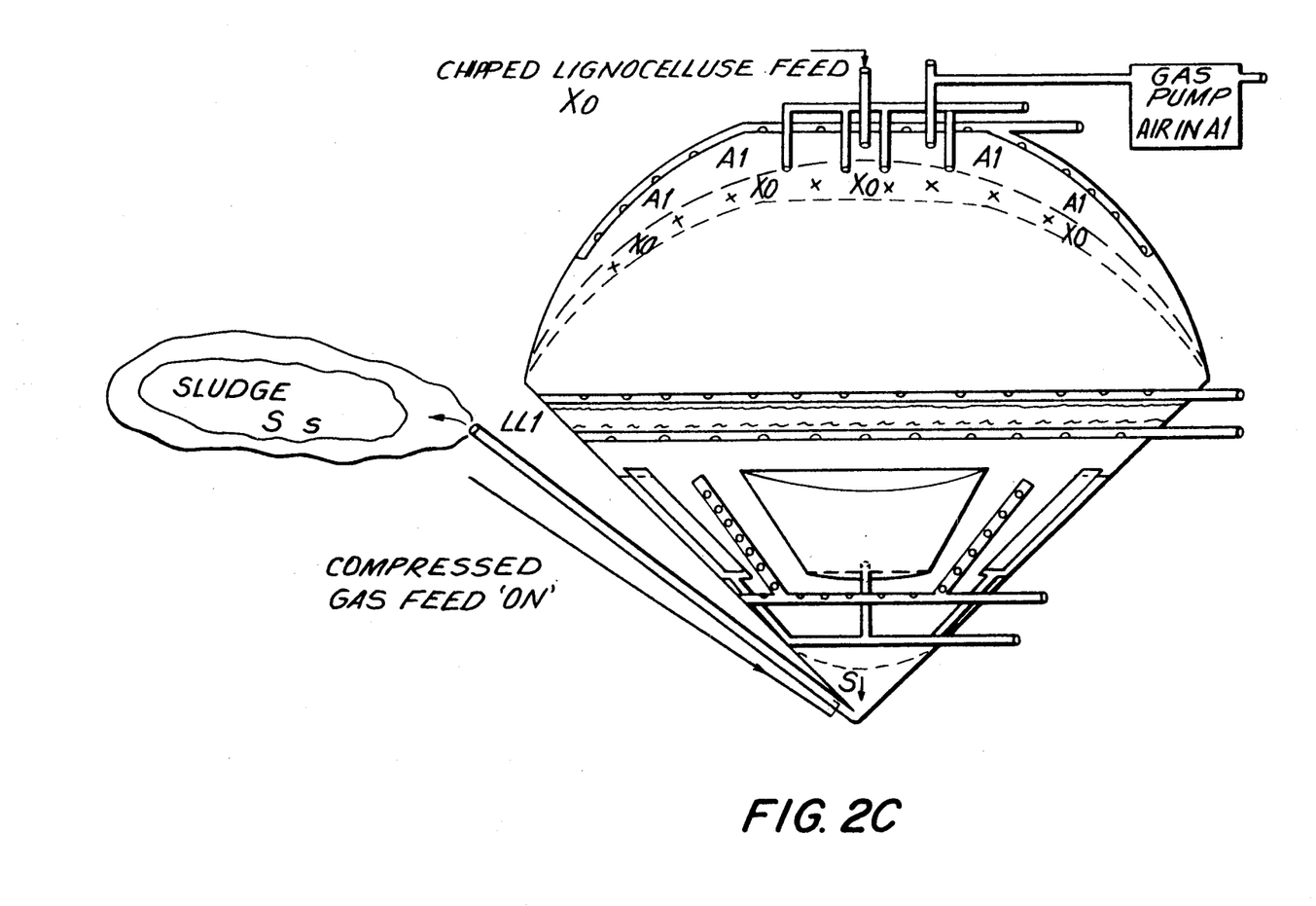
Figure 3:
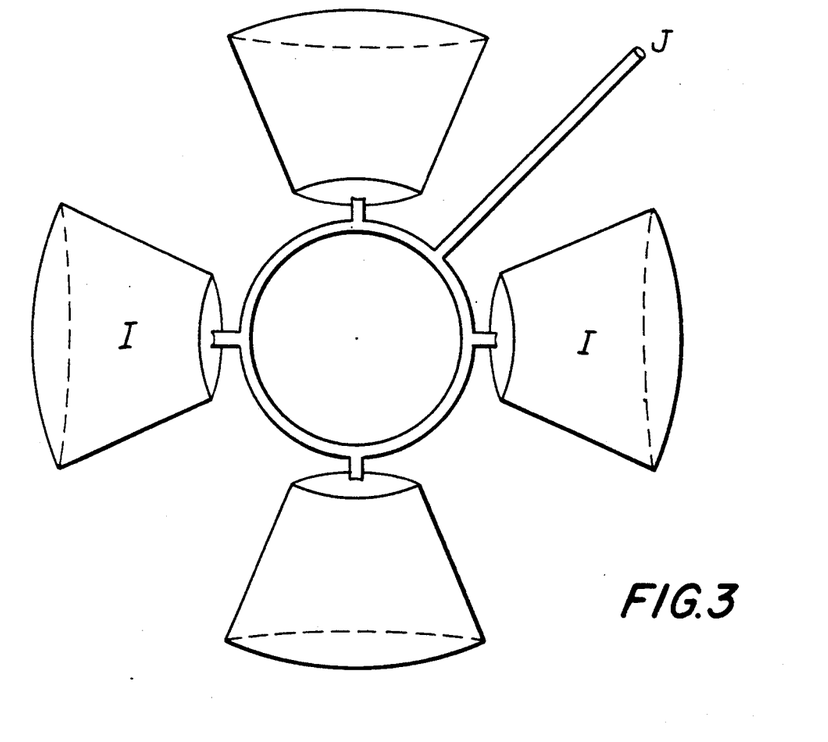
FIG. 3 shows the typical connection by (J) the tube through which the bladders (I) are filled and drained of fluid.
Figure 4:
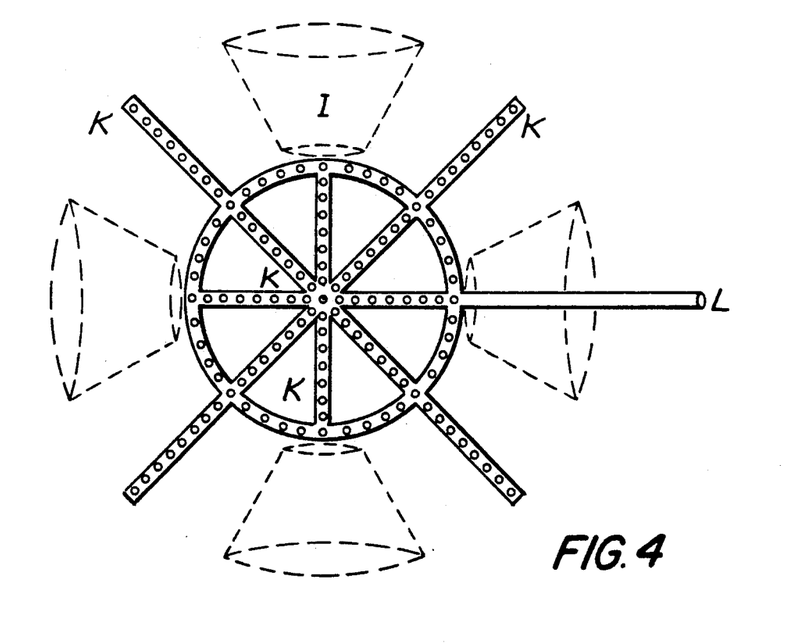
FIG. 4 shows the feed tube (L) for the introduction of liquids to the array of emitters (K).
Figure 5A:
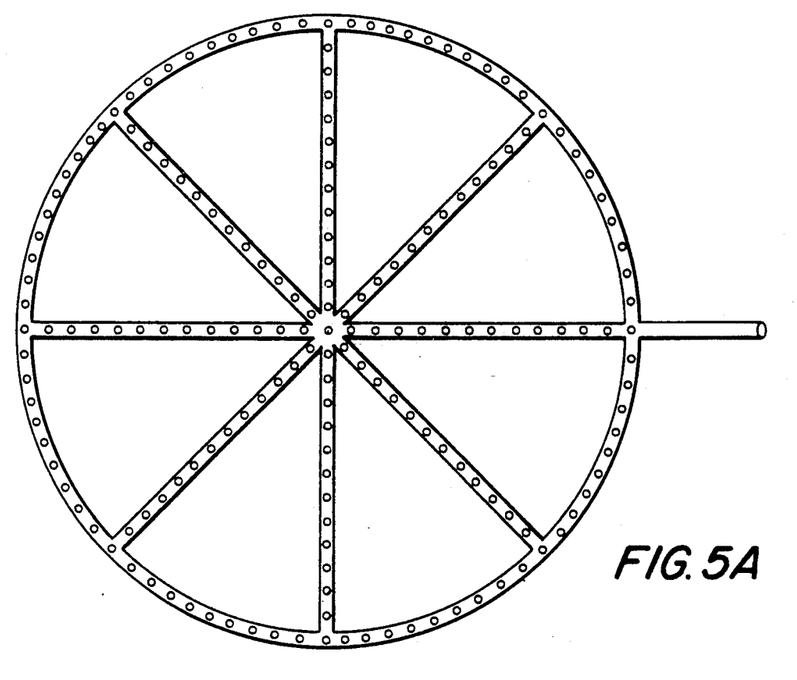
FIG. 5A shows the top view of the array of emitters on the lattice (E).
Figure 5B:
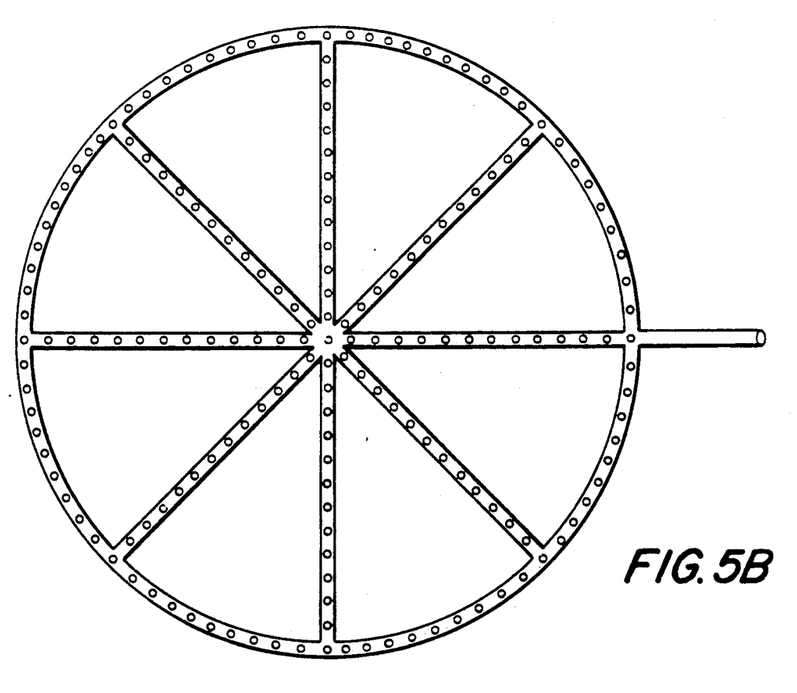
FIG. 5B shows the bottom view of the array at the bottom of the lattice with collectors (F).
Figure 6:
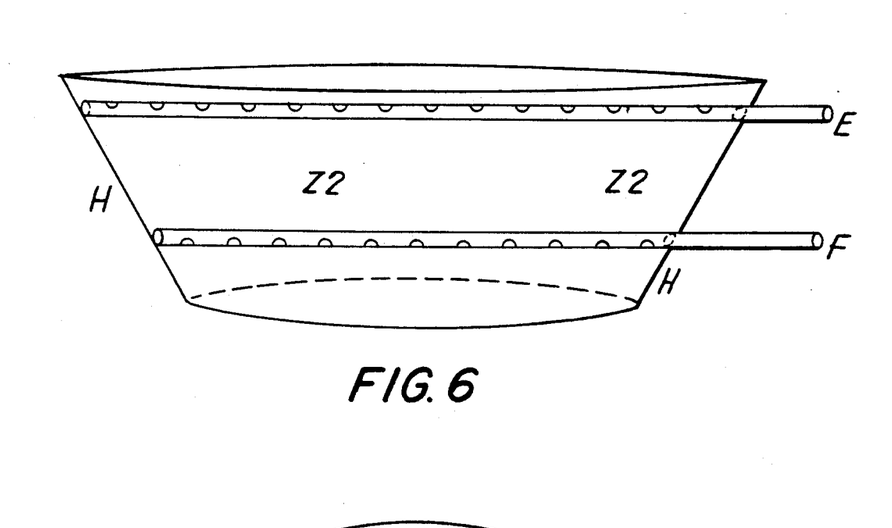
FIG. 6 shows the space between (E) and (F) forming zone 2.
Figure 7:
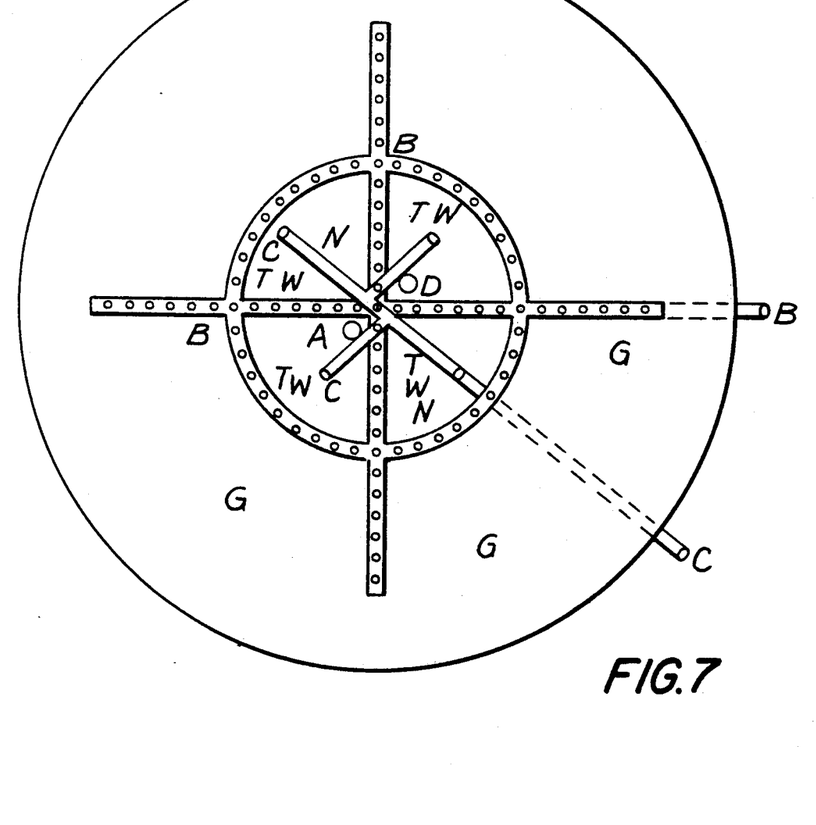
FIG. 7 shows the typical array for the structure (N) onto which (A), (B), (C) 1: onto the tip of which (T) and (W) are fixed, and (D) are fixed.
Figure 8:
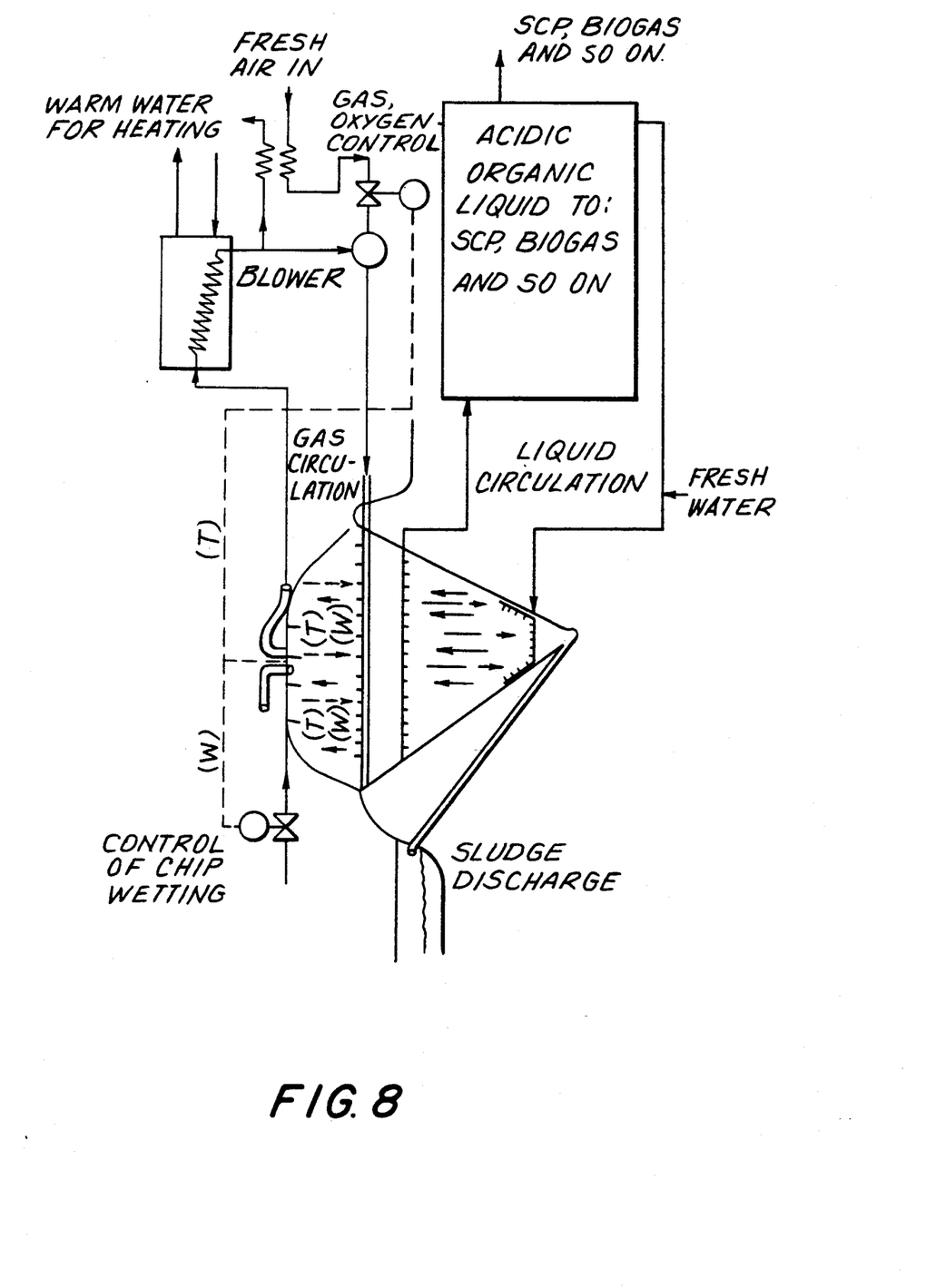

Discharge through (M).

As the liquid level in the reactor is within zone 2, when the gas pressure in the reactor is that of the outside, and as the discharge port is below the bottom of zone 2, stimulation and reduction of the density of the sludge in (M) with compressed air will motivate discharge of the contents of (Z4) through (M). When the solids in zone 4 are removed, more particles are free to pass through the lattice (L) into zone 4. As zone 3 is gently distorted by the sequential filling and emptying of the bladders, particles that are dislodged from the compressed mass at the lattice, that are denser than the environmental liquid, will pass through the lattice to form a sediment in zone 4. As the material at the bottom of zone 3 passes into zone 4, material above will be unsupported. As the bladders alternately compress and release the solid material horizontally in zone 3 and as the diameter of zone 3 decreases as the bottom is approached, and as the particulate material is not cohesive, the mass of particles will change shape so as to fill the voids caused by material flowing into zone 4. The material in zone 3 will thus become less compact, thus more compressible. As the material in zone 2 is resting on the material in zone 3, material from zone 2 will flow into zone 3, so that the materials now in zone 3 are able to support the forces transferred from the materials in the above zones. As the material in zone 1 is resting on the intermediate lattice (the structure supporting the arrays (E) and (F)) and on the materials below, reduction of the gas pressure internally relative to the external pressure will cause the flexible containment to press on the contents. This pressure will force some of the materials in zone 1 to pass through the lattice into zone 2 and consequentially into zone 3. Fresh compressible porous particulate materials may then be added to the materials in zone 1. To effect this, the pressure within the containment is increased to be greater than the external pressure so that the gas pressure thus lifts the cover structure, thus leaving space so that fresh compressible particulate materials can be introduced through (A). Thus materials introduced through (A) are finally emitted through (M) by operating the mechanisms of the reactor and can be reacted with suitable reagents with desirable consequence.

TYPICAL USE; ORGANIC ACIDIC LIQUID, HOT AIR, AND SOIL IMPROVER SLUDGE FROM BIOMASS

Chipped agricultural residues such as bagasse or straw, are fed into the reactor while the reactor is in an inflated condition. This material heaps in the form of a cone pointing upwards. When Z1 is again full, the contents is wetted with water through the emitters from the array (B). Air is fed to the bottom of the heap through (E) and it travels upwards.

Microbes in the stack begin composting the biomass. As composting takes place the heat produced thereby is transferred to the upflowing air which is removed through (D). THUS HOT AIR IS PRODUCED. Should the composting process take place too rapidly and the materials begin to auto-oxidize, water is injected through (C) which was driven into the heap when the cover rested on the contents. Should the pressure inside be further reduced, (C)'s insertion will be further motivated. Under normal conditions if there is a small change in temperature the oxygen content of the circulated gas will change in response to the availability of fresh oxygen (air) controlled by valve (V11) and the desired temperature produced thereby. As the material closest to the lattice has been in zone 1 longest and the conditions in zone 1 promote composting, the materials therefore entering zone 2 is that which is most composted and, as most composted can be adjusted to be coincidental with maximum cellulose exposure for part-composting, the materials entering zone 2 can be that with maximum exposed cellulose This transfer of delignified material by part-composting is motivated by a reduction of the pressure within the containment to below atmospheric. This reduction of internal pressure causes the cover to push against the material in the heap of zone 1. As this pressure is applied and as it is transferred to the contents, they compress in response to the application of this force. This compression takes place principally in zones 1, 2, and 3. As the materials in zones 2 and 3 are also compressed and as the volume of zone 2 and 3 are fixed, some of the material from the variable volume of zone 1 passe into zone 2 and subsequently to zone 3 to occupy the volume made available as a result of the decrease in volume of the original compressed contents of zones 2 and 3 in response to the same compression. Common in temperature controlled composting are a group of fungi that delignify biomass (cellulose exposure). As these microbes are aerobic, when they are submerged in zone 2 they die, leaving delignified biomass. This delignified biomass contains much air, but as it is submerged under reduced environmental pressure, when the environmental pressure is normalized the voids in the biomass become partly filled with the liquid within which they are submerged. On the subsequent application of reduced pressure, more of the entrapped gas is expanded and released; the biomass absorbing more liquid as they consequently approach (F). By this process the biomass is assisted into becoming anaerobic. This condition is desirable as the microbes desirable in zone 3 are anaerobic and oxygen reduces their effectiveness.

In zone 3 the nutrient liquid (usually recycled liquid subsequent to use outside of the reactor) is introduced through (L) and the array of emitters and it travels principally upwards. On the journey upwards it carries enzymes that degrade the exposed cellulose. The degradation products of the cellulose produced by many wild anaerobic microbes are acidic organic liquids which are dissolved into the upflowing water. This liquid is collected by the array of collectors at the top of zone 3 (bottom of the intermediate lattice of zone 2. As these collectors are connected to (F) these liquids are thus removed from the reactor. THUS ACIDIC ORGANIC LIQUIDS ARE PRODUCED. As one proceeds further down the reactor in zone 3, one encounters an area wherein microbes that produce the above mentioned enzymes are most viable and the microbes thrive in greatest concentration. These microbes are often attached to the cellulose on which they feed and prefer an environment less acidic than that obtained in the upper regions of zone 3. As these microbes consume the cellulose onto which they are attached, they are dislodged; thus as the cellulose is consumed and travels downwards, the microbes are washed upwards by the upflowing liquid and attach themselves to fresh cellulose. This cellulose is pushed downwards by reactor manipulation. In this case solids reduction, from cellulose consumption by the microbes and enzymatic degradation of cellulose in the production of acidic organic material, further motivates the downward flow of fresh porous material to replace that which was digested. As there is fresh liquid introduced below the zone in which the microbes are located in zone 3, this liquid carries the microbes and enzymes up through the descending solids. By this relative movement, zones relatively static in terms of location within the reactor can be formed. The timing of the near complete cellulose consumption is coincidental with the approach to the end of zone 3. At this stage the reduction in fiber content assists disentanglement of particles from the mass so that they may pass into zone 4. The residue settles in the conical volume, cone pointing downwards. As there is no counter current in zone 4, the solid material concentrates await discharge. Zone 4 is discharged by opening the valve on (M) and introducing some compressed gas through (O). This affects the density and viscosity of the material in (M) and as a result motivates discharge through (M). As (M) is connected to zone 4, Zone 4 is thereby subsequently discharged. THUS SOIL IMPROVING SLUDGE IS PRODUCED.

In this case the residual product of Zone 1 from (M) can be subsequently used as soil improver or fuel. The acidic organic liquids discharged through (F) can be subsequently used to grow microbic or to produce biogas. The hot air emitted from (D) may be used subsequently for heating. As the time between the introduction of a particle through (A) and the discharge of its residue through (M) may be in excess of twenty (20) days, by the introduction of fresh lignocellulosic material, say twice weekly, a near continuous production of hot air and acidic organic liquid may be obtained.

The organic liquid obtained from the digestion process above may be used to produce biogas or if mixed with fertilizer may be used to produce SCP, single cell protein. Thus many lignocellulosic materials that are near indigestible by many animals can be converted to SCP, biogas etc. The biogas is valuable fuel, the SCP is a valuable food that is easily digested by many animals. The temperature regulation of zone 1 is important in promoting the viability of the better delignifiers. This control is obtained by controlling the oxygen (air) content of the gas circulated through zone 1. Some of the previously circulated gas is released from the system so that a similar volume of circulated gas is obtained.

I claim:

1. A method of decomposing particulate, lignocellulosic material to produce an organically-enriched liquid, comprising the steps of:
    (a) arranging an upper zone vertically above a lower zone;
    (b) feeding the particulate material in a moistened state into the upper zone along a feed path that extends downwardly into the lower zone;
    (c) supplying an oxygen-containing gas into the upper zone to flow countercurrently to the feed path, thereby crating an aerobic environment in which biodelignification of the moistened material occurs;
    (d) allowing the biodelignified material to descent in the lower zone;
    (e) supplying a liquid into the lower zone to flow countercurrently to the feed path in an amount sufficient to submerge the biodelignified material, thereby creating an anaerobic environment in which digestion of the submerged material occurs, together with concomitant production of soluble organic matter;
    (f) dissolving the soluble organic matter in the liquid; and
    (g) removing the liquid enriched with the dissolved organic matter from the lower zone.

2. The method according to claim 1; and further comprising the steps of covering the upper zone with a collapsible cover overlying the moistened particulate material, and evacuating the gas under the cover from the upper zone to collapse the cover onto the moistened particulate material and push the latter along the upper zone.

3. The method according to claim 1; wherein the material feeding is performed at an upper region of the upper zone, and wherein the gas supplying is performed at a lower region of the upper zone.

4. The method according to claim 1; wherein the liquid supplying is performed at a lower region of the lower zone, and wherein the liquid removal is performed at an upper region of the lower zone.

5. The method according to claim 1; and further comprising the step of discharging the digested material from the lower zone.

6. The method according to claim 1; and further comprising the step of displacing the submerged material in the lower zone.

7. The method according to claim 6, wherein the displacing step is performed by arranging inflatable bladders within the lower zone, and inflating the bladders.

8. The method according to claim 1; and further comprising the step of detecting the temperature and humidity of the biodelignified material in the upper zone.

9. The method according to claim 1, wherein the arranging step is performed by forming the layer zone with a conically-shaped passage that converges downstream along the feed path.

10. The method according to claim 1, wherein the gas supplying is performed by discharging the gas from multiple gas nozzles arranged across the feed path; and wherein the liquid supplying is performed by discharging the liquid from multiple liquid nozzles arranged across the feed path; and wherein the liquid removal is performed by collecting the enriched liquid with multiple liquid nozzles arranged across the feed path.

* * * * *